US006276884B1

(12) United States Patent
Bueter

(10) Patent No.: US 6,276,884 B1
(45) Date of Patent: Aug. 21, 2001

(54) SEALED THREADED PAIRING OF TWO THREADED PARTS WITH SEALING COMPOUND THEREBETWEEN

(75) Inventor: Josef Bueter, Haren (DE)

(73) Assignee: Buemach Engineering International B.V., Emmen (NL)

( * ) Notice: Subject to any disclaimer, the term of this patent is extended or adjusted under 35 U.S.C. 154(b) by 0 days.

(21) Appl. No.: 09/424,553

(22) PCT Filed: Jun. 16, 1998

(86) PCT No.: PCT/DE98/01706

§ 371 Date: Nov. 24, 1999

§ 102(e) Date: Nov. 24, 1999

(87) PCT Pub. No.: WO99/28637

PCT Pub. Date: Jun. 10, 1999

(30) Foreign Application Priority Data

Nov. 29, 1997 (DE) .......................................... 297 21 200 U

(51) Int. Cl.$^{7}$ ..................................................... F16B 33/00

(52) U.S. Cl. .......................... 411/369; 411/277; 411/258; 285/92; 285/338

(58) Field of Search ................................ 411/371.1, 369, 411/542, 308–310, 258, 82.2, 277; 285/92, 338

(56) References Cited

U.S. PATENT DOCUMENTS 597,000 * 1/1898 Higbee ................................ 411/309
2,255,384 * 9/1941 Hood .................................... 411/277
2,388,467 * 11/1945 Cole .................................... 411/227
3,687,493 * 8/1972 Lock .
5,165,731 * 11/1992 Kimuta ................................ 411/369

FOREIGN PATENT DOCUMENTS

2063927 * 7/1972 (DE) .................................... 411/258
296 04 120 U1 7/1996 (DE) .
44 39 250 C1 8/1996 (DE) .

* cited by examiner

*Primary Examiner*—Flemming Saether
(74) *Attorney, Agent, or Firm*—Michael J. Striker

(57) ABSTRACT

The invention relates to a threaded pairing, consisting of the assigned threaded parts, for the transmission of axial forces, where the screw thread (5) is filled with the sealing compound (6). The task is to create an axially positionable threaded pairing capable of being turned, a joint which at the same time is sufficiently rigid (by means of frictionally connected flanks) and leak-proof (by filling the positively fitting screw thread with sealing compound (6)). This task is successfully completed by at least one threaded part (1) consisting, in terms of the length of its axial thread (7), of a cylindrical flanked basic body (8) and a non-cylindrical flanked basic body (9), being screwed together with the assigned threaded part (2) in the axial length section of the non-cylindrical flanked body (9) and thus forming a line-like contact between the opposing flanks (4) at the point of maximal radial difference against the flanked basic body of the assigned threaded part (2) which is under radial tension of the flanks (4). This radial tension ensures that the threaded parts are fixed over a stop-free adjustment area (10) and that both sides of the flanks (4) are embedded into the sealing compound (6) through flank clearance (11).

7 Claims, 2 Drawing Sheets

SEALED THREADED PAIRING OF TWO THREADED PARTS WITH SEALING COMPOUND THEREBETWEEN

BACKGROUND OF THE INVENTION

The invention relates to a threaded pairing comprising two threaded parts. This threaded pairing is hermetically sealed by a sealing compound between the parts. Such threaded pairings are used principally in applications where a steady turning angle must be warranted in respect to a discrete axial positioning between the threaded parts and the resulting joint must also be leak-proof and resistant to distortion.

There are a number of different state of the art technological solutions. In the case of a customary threaded pairing in line with the classification F16B of the international Patent Classification (IPC) the two threaded parts are generally screwed into each other against an axial stop of one of the threaded parts, which is used with an admissible axial tension to create a positively fitting and frictionally actuated joint. This arises both from the positive interlocking of the thread flanks and from pitting the respective thread flanks against each other.

A sealed threaded joint is disclosed, for example, in the publication DE-U1-29604120. In this an essentially hollow cylindrical receiving section adjoins the hollow cylindrical part of a threaded sleeve, so that a step in the transition forms a sealing device which serves as a receptacle for the assigned counterpart, and with either elastic or plastic deformation also ensures a sealing. In such a threaded joint, no additional turning of one of the threaded parts beyond the torsion angle determined by the axial stop is possible as the axial limit stop ensures clear positioning and any additional turning would lead either to an inadmissible loosening or excessive tensioning. The positional anomalies of the threaded parts against each other prevent their free rotation and also result in a fixed axial position determined by the stop. Such rigid positioning of the threaded parts in relation to each other makes it necessary, for example, to carry out extensive adjustment work in serial production, i.e. to create adjustable limit stops. This leads to unnecessary production costs.

It is also known that frictionally-connected wedge-shaped union or sealing devices are used for the transmission of axial traction or fluid power. The publication DE4439250C1 discloses, for example, a sealing element for pipes with a wedge-shaped lip, which when used together with an axial tapered collar creates a releasable frictionally-connected joint and seal. Due to the positional allocation of the parts to be connected, such frictionally-connected joints are mostly insufficiently fixed and frequently difficult or even impossible to release. In particular, it is not possible to adjust the assigned positioning.

So-called "floating fittings" are also known. As these only provide for a positive positioning of the threaded parts, without any tensioning there is a certain play between the threaded parts. Such a positioning is only determined by a positive allocation of the threaded parts and thus it is necessary to secure it, for example against turning. However, in many applications such play is not admissible.

Applying sealing compounds in the screw thread is a known method for sealing threaded pairings. In most cases, such sealing compounds are applied as liquids or pastes to the screw thread prior to the final assembly and cured subsequently. This ensures that the screw thread itself does not constitute an opening, and at the same time the positioning is secured by fixing the threaded pairing.

However, in a customary positively-fitting and frictionally-connected joint it is not possible to seal with a suitable sealing compound, as the compound cannot continuously fill the gap between the supporting flanks of the compressed threaded pairings. This is due to the one-sided tensioning of the threaded pairing and the resulting stress. As a result, the small cracks in the sealing compound and the ruptures in the flanks expand over time and the threaded pairing becomes more permeable. For this reason, this method of filling up the screw thread, which only constitutes an adequately filling between the free flanks, is only used for fixing the position with the application of an adhesive. A sealing effect cannot be achieved.

On the other hand, suitable sealing compounds can be successfully used as seals for "floating fittings", as in this application both sides of the screw thread can be adequately filled with sealing compound. However, the threaded parts are not positioned directly against each other, but instead are softly embedded in the sealing compound. This results in such components being considerably less rigid than is customary for threaded joints. This degree of rigidity is insufficient for many applications.

SUMMARY OF THE INVENTION

In overcoming the above disadvantages, the task of invention is to provide an axially positioned threaded pairing capable of being turned, a threaded pairing which would also constitute a sufficiently rigid threaded joint by means of a frictionally-connected flank positioning and a leak-proof joint by completely filling the positively-fitting screw thread with sealing compound. This should facilitate the technologically simple fitting of the top and bottom breechblocks to the piston tube of pressurised media driven working cylinders in particular.

In keeping with these objects and with others which will become apparent hereinafter, one feature of present invention resides, briefly stated, in a two assigned threaded parts having a thread of a same pitch value and connected by said thread in a positively-fifting and frictionally-connected manner; a sealing compound which seals said thread, at least one of said parts along a length of its thread has a cylindrical flanked basic body and a non-cylindrical flanked basic body, so that when another of said parts is assembled with said non-cylindrical flanked body a substantially linear contact of opposing flanks of said bodies is formed at a point of maximal radial difference against a flanked basic body of said other part under radial tension of flanks, so that the radial tension ensures fixing of said parts by said flanks so that said flanks of said cylindrical flanked basic bodies within said thread have free flank clearance and are free in respect of each other, and a continuous turning of said parts over a stop-free axial adjustment area is allowed, and said flank clearance ensuring that both sides of said flanks are completely embedded in said sealing compound.

The essence of the invention lies in the fact that at least one of the threaded parts of the threaded pairing consists of a preferably wedge-shaped, flank-bearing basic body which has a cylindrical and a non-cylindrical part along its axial length, with the same pitch of thread running throughout. When screwed into the allocated section of the screw thread along the axial length of the flank-bearing non-cylindrical basic body, it exerts a radial tensioning between the flanks. The frictional connection thus ensures a fixing of the joint by means of the flanks. By means of the direct pressure exerted by the flanks, the joint created is extremely rigid in comparison to the "floating fittings".

Screwing this longitudinal section of the threaded pairing together when there is no axial tension creates only a line-like contact between the opposing flanks along the entire length of the screw thread, i.e. at the point of maximal radial difference against the basic body of the assigned thread section. Due to the radial tension, the opposing flank tips arrange themselves symmetrically; in the case of an axial assembly which is free of tension this occurs over the entire length, and in any other case at least around the line-like contact. The radial difference of the basic body to the assigned section of the screw thread, individually assigned to every axial position, is a direct measure of the clearance between the thread flanks which results from the form and pitch of the flanks. Outside the area of the line-like contact in particular, clearance between the thread flanks is greater than nil and the flank tips are arranged symmetrically. This means that both sides of the flanks can be embedded into a sealing compound, thus meeting the conditions for a successful sealing.

The radial difference, and thus the radial tension as well, depend on the relative positioning of the threaded parts and the geometry of the individual basic bodies. Accordingly, it is possible to choose from a wide range of suitable non-cylindrical basic bodies, for example when applying a specified axial adjustment area of the thread coupling and an admissible radial tensioning interval as parameters. When selecting from this range, non-cylindrical basic bodies which are at least partially conical are preferred. In line with the geometry of the flanks and the basic body and with the admissible tensioning interval, it is guaranteed that the relative position of the two threaded parts can always be adjusted as necessary. In the case of turning, this position is constant; in the case of a specified torsion angle for a given axial position it is discretely dependent on the pitch of the thread. In combination with a second similar threaded pairing with an opposing thread direction, both the turning and the axial positioning can be adjusted at all times.

The particular advantages of the invention are:

- the technologically simple production of such threaded pairings,
- threaded pairings which are guaranteed leak-proof and can also be adjusted as necessary, and
- extremely rigid joints when compared to "floating fittings".

The invention is explained in greater detail with the help of an implementation example:

DESCRIPTION OF THE PREFERRED EMBODIMENTS

Figure 1:
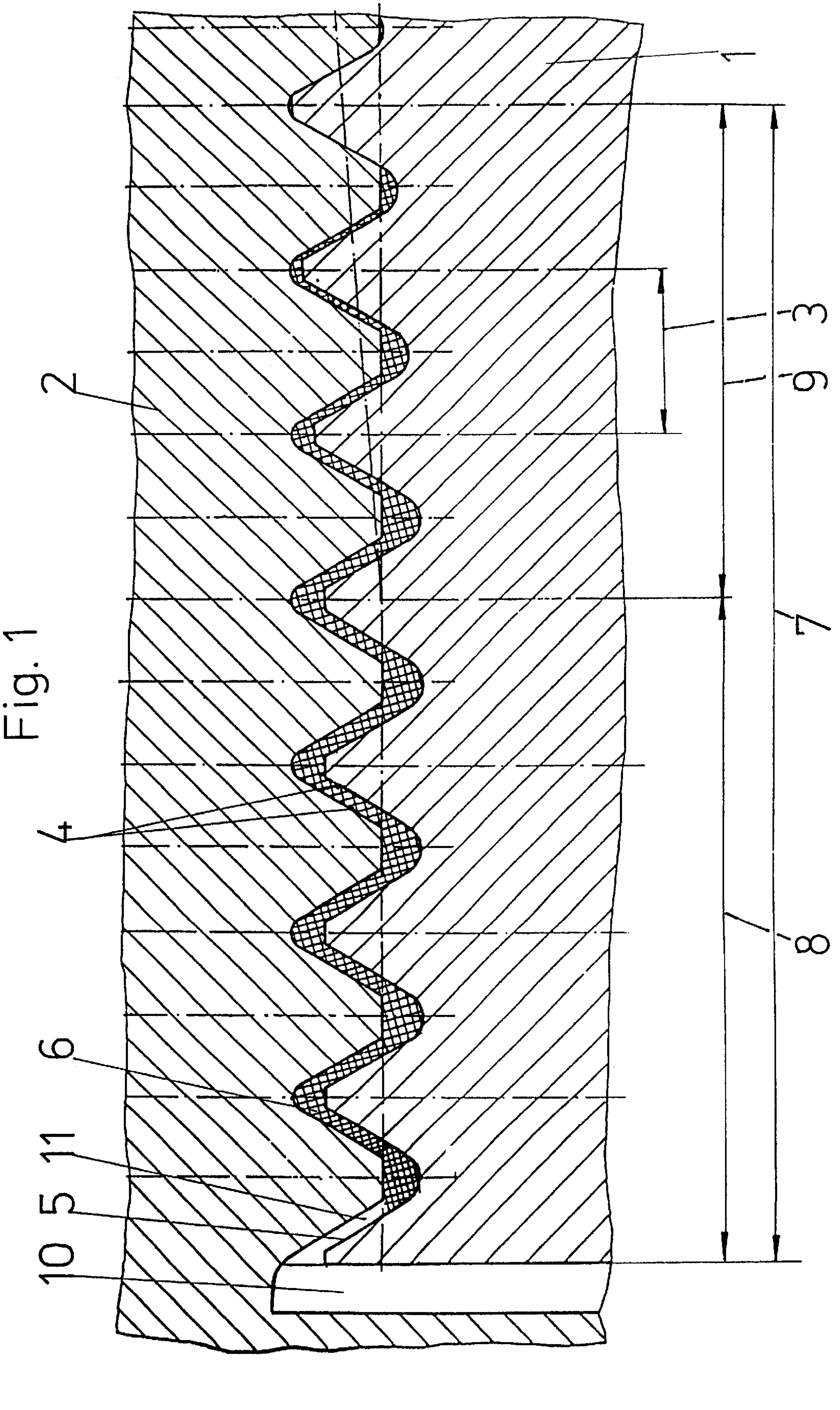
FIG. 1 is a view showing a principle of threaded pairings and detail X of FIG. 2

In line with FIG. 1 the principle of threaded pairings for the transmission of the axial forces is described. Two mutually assigned threaded parts, (parts 1 and 2), each with a screw thread 3 of the same pitch, are joined together so that they are positively-fitting and frictionally-connected. The screw thread 5, formed between the flanks 4, is filled with a sealing compound 6, for example, a curable paste or lacquer type plastic. In the implementation of the invention, at least one threaded part 1 of the threaded pairing consists, in terms of the length of its axial thread 7, of a cylindrical flanked basic body 8 and a non-cylindrical flanked basic body 9. On interconnecting this threaded part with the other assigned threaded part 2, which is located in the axial length section of the non-cylindrical flanked body 9, a line-like contact between the opposing flanks 4 is formed at the point of maximal radial difference against the flanked basic body of the assigned threaded part 2, under the radial tension arising between the flanks 4. This radial tension both ensures that the threaded parts (1, 2) are fixed relatively by the flanks 4 and also enables the threaded parts (1, 2) to turn continuously over a stop-free axial adjustment area 10. At the same time, this radial tension ensures that the existing flanks 4 on the respective cylindrical flanked basic bodies 8 within the screw thread 5 have a free flank clearance 11 and are free in respect of each other. The flank clearance 11 ensures that both sides of the flanks 4 are completely embedded into the sealing compound 6 and thus guarantees a reliable seal.

Figure 2:
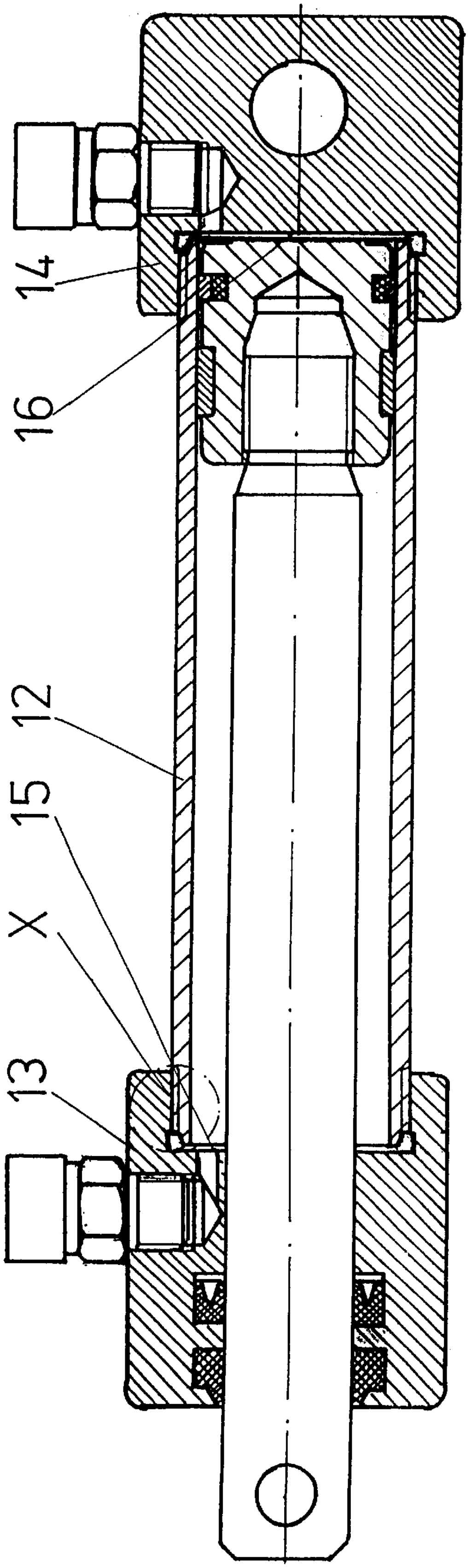
FIG. 2 is a view showing an application example in a working cylinder for fluid pressure media.

In line with FIG. 2 and the detail X, such a threaded pairing can be used advantageously for a working cylinder for fluid pressure media. In respect of its axial thread length 7, the threaded part 1 of a piston tube 12 consists of a cylindrical flanked basic body 8 and a non-cylindrical flanked basic body 9, preferably a conical basic body. Preferably, the piston tube 12 has such a threaded pairing at both ends. In the execution as piston tube 12, both threads of the threaded part 1 have the same pitch 3 and are screwed into the assigned threaded part 2 as guide breechblock 13 and as bottom breechblock 14. During the interconnection, a radial tension is generated between the piston tube 12 and the guide breechblock 13/bottom breechblock 14. This radial tensioning results in an adhesive momentum which ensures the fixing of the threaded joint and at the same time forms a free screw thread 5. A sealing substance 6 is introduced into this space and provides effective sealing against the pressure medium fluid. Coupling the piston tube 12 to the guide breechblock 13/bottom breechblock 14 facilitates adjustability on both sides, provided it is ensured that the piston tube is not screwed against a limit stop at the breechblock guide or the bottom breechblock stop. In assembly, the frontal surfaces of the piston tube 12 are kept within the distance of the stop-free axial adjustment area 10 extending from the breechblock guide stop 15 to the bottom breechblock stop 16, which should preferably have half the dimensions of the pitch value 3.

The thread for the following applications:

- pneumatic working cylinder in the pressure range of 0.2–2 MPa
- hydraulic working cylinder in the pressure range of 2–100 MPa is preferably executed within the limits of the following parameters:
- cone angle 1:8–1:18
- pitch 0.5–5 mm Two threaded pairings with the same thread direction, located at the piston tube 12, facilitate the steady/discrete adjustment of the axial positioning of the breechblock guide stop 15 in relation to the bottom breechblock stop 16. This in turn allows both the precise setting of the stroke as desired and the steady/discrete assignment of the turning angle of the guide breechblock 13 to the bottom breechblock 14 or vice-versa. Both settings are limited by the admissible radial tensioning interval, this in terms of the size of the available free axial adjustment area 10. If attention is paid to these parameters, the adjustability of the relative positioning of the screwed parts is warranted. Adjustment precision depends on the selection of the pitch value 3 of the thread. When a suitable sealing compound 6 is chosen, adjustment tightness is determined by the flank clearance 11 between the flanks 4 within the cylindrical flank pairing. The sealed threaded pairing at the ends of the piston tube 12 may be executed as right or left thread, or if a more precise adjustment of the relative position of the guide breechblock 13 to the bottom breechblock 14 is required, as right thread on one side and left thread on the other, in such a way as to enable a steady setting of the axial adjustment and/or torsion.

What is claimed is:

1. A sealed threaded pairing for transmission of axial forces, comprising two assigned threaded parts having a thread of a same pitch value and connected by said thread in a positively-fitting and frictionally-connected manner; a sealing compound which seals said thread, at least one of said parts along a length of its thread has a cylindrical flanked basic body and a non-cylindrical flanked basic body directly engaging said thread of the other of said threaded parts, so that when another of said parts is assembled with said non-cylindrical flanked body a substantially linear contact of opposing flanks of said bodies is formed at a point of maximal radial difference against a flanked basic body of said other part under radial tension of flanks, so that the radial tension ensures fixing of said parts by said flanks so that said flanks of said cylindrical flanked basic bodies within said thread have free flank clearance and are free in respect of each other, and a continuous turning of said parts over a stop-free axial adjustment area is allowed, and said flank clearance ensuring that both sides of said flanks are completely embedded in said sealing compound.

2. A sealed threaded pairing as defined in claim 1, wherein said non-cylindrical flanked basic body has a geometry which, taking into account a geometry of said flanks and said pitch value, is determined by a desired distribution of a radial tension around said non-cylindrical flanked basic body by an axial length of said stop-free axial adjustment area.

3. A sealed threaded pairing as defined in claim 1, wherein said non-cylindrical flanked basic body is formed as a conical basic body.

4. A sealed threaded pairing as defined in claim 1, and further comprising a second threaded pairing having an opposing rotational direction offset to provide a steady positioning of said parts in respect of axial positioning and torsion.

5. A device, comprising a fluid-driven working cylinder; a bridge block with a piston tube; and a sealed threaded pairing used for sealing of said fluid-driven working cylinder and for axial power transmission of said block with said piston tube, said threaded pairing including two assigned threaded parts having a thread of a same pitch value and connected by said thread in a positively-fitting and frictionally-connected manner; a sealing compound which seals said thread, at least one of said parts along a length of its thread has a cylindrical flanked basic body and a non-cylindrical flanked basic body directly engaging said thread of the other of said threaded parts, so that when another of said parts is assembled with said non-cylindrical flanked body a substantially linear contact of opposing flanks of said bodies is formed at a point of maximal radial difference against a flanked basic body of said other part under radial tension of flanks, so that the radial tension ensures fixing of said parts by said flanks so that said flanks of said cylindrical flanked basic bodies within said thread have free flank clearance and are free in respect of each other, and a continuous turning of said parts over a stop-free axial adjustment area is allowed, and said flank clearance ensuring that both sides of said flanks are completely embedded in said sealing compound.

6. A device as defined in claim 5, wherein said bridge block is a guide bridge block.

7. A device as defined in claim 5, wherein said bridge block is a bottom bridge block.

* * * * *